(12) United States Patent
Zhou et al.

(10) Patent No.: US 9,416,232 B2
(45) Date of Patent: Aug. 16, 2016

(54) SOLVENT-FREE EMULSIFICATION OF HIGH VISCOSITY RESIN

(71) Applicant: Xerox Corporation, Norwalk, CT (US)

(72) Inventors: Ke Zhou, Oakville (CA); Nan-xing Hu, Oakville (CA); Guerino G Sacripante, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/595,634

(22) Filed: Jan. 13, 2015

(65) Prior Publication Data

US 2016/0200879 A1  Jul. 14, 2016

(51) Int. Cl.
*C08K 5/34* (2006.01)
*C08J 3/07* (2006.01)

(52) U.S. Cl.
CPC ............... *C08J 3/07* (2013.01); *C08J 2367/00* (2013.01)

(58) Field of Classification Search
CPC .............................. C08J 3/07; C08J 2367/00
USPC ........................................................ 524/100
See application file for complete search history.

(56) References Cited

U.S. PATENT DOCUMENTS 7,989,135 B2 * 8/2011 Zhou .......................... C08J 3/05
430/137.14

* cited by examiner

*Primary Examiner* — Hui Chin
(74) *Attorney, Agent, or Firm* — Marylou J. Lavoie, Esq. LLC

(57) ABSTRACT

A solvent-free emulsification process for making a latex where a high viscosity resin is prepared under pressure is described.

20 Claims, No Drawings

SOLVENT-FREE EMULSIFICATION OF HIGH VISCOSITY RESIN

FIELD

The disclosure relates generally to the use of heat and pressure, in the absence of organic solvents, to emulsify high viscosity resins to produce resin particle emulsions useful in the preparation of toner.

BACKGROUND

To make toner, resins often are suspended in an aqueous dispersion or emulsion. Two processes often are used to prepare latex, phase inversion emulsification utilizing an organic solvent to dissolve the resin or a solvent-free process relying on surfactant, neutralization agent and optionally water to dissolve the resin. The reactions can occur in a batch reactor or in a continuous reactor. Both of those processes have shortcomings and are inadequate for emulsifying high viscosity resin. Some commonly used resins have a softening point of at least about 120° C. generating issues arising from the loss of water during processing.

Solvent-free emulsification of polyester resin for emulsion aggregation (EA) toner has been described previously, see, for example, U.S. Pat. No. 7,989,135, the entire disclosure of which herein is incorporated by reference in entirety. That process, however, falls short when high viscosity resins are used; the higher viscosity of the resin at processing temperatures (e.g. at 90° C. or greater, for example, at about 100° C.) causes processing difficulties.

Therefore, new processes that produce latex, including at predictable and desired particle size, utilizing high viscosity resins in the absence of solvents are desirable.

SUMMARY

The instant disclosure describes a solvent-free process for making a latex from high viscosity resins. In embodiments, the process of the instant disclosure includes heating at least one high viscosity resin to a temperature of about 90° C. or higher to form a heated resin in a reaction vessel comprising a mixing device; combining the heated resin with a surfactant, a neutralization agent and optionally water in the absence of an organic solvent to form a mixture in the reaction vessel; increasing pressure in the vessel to from about 110 to about 1000 kPa, or about 10 to about 1000 kPa above ambient pressure; adding water to the mixture to form an emulsion under agitation; and reducing pressure in the vessel to obtain a solvent-free emulsion comprising resin particles.

In embodiments, the process may include heating at least one high viscosity polyester resin comprising a softening point of at least about 115° C. to a temperature of about 110° C. to about 120° C. to form a heated resin in a reaction vessel comprising a mixing device; combining the heated resin with a surfactant, a neutralization agent and optionally water in the absence of an organic solvent to form a mixture in said reaction vessel; increasing pressure in said vessel to from about 120 to about 160 kPa, adding water to said mixture to form an emulsion; and reducing pressure in said vessel to obtain a solvent-free emulsion comprising resin particles.

In embodiments, the process includes adjusting the ratio of neutralization agent to resin based on acid value of the resin to obtain resin particles of a desired size, for example, from about 50 nm to about 900 nm. The neutralization agent is selected from inorganic basic agents and organic basic agents, wherein the basic agents may include monocyclic compounds and polycyclic compounds having at least one nitrogen atom, a secondary amine and so on.

In embodiments, the high viscosity resin has a molecular weight of at least about 5000. In embodiments, the high viscosity resin has a melt viscosity of from about 10 to about 1,000,000 Pa*S (pascal second) at about 130° C., from about 50 to about 100,000 Pa*S at about 130° C.

DETAILED DESCRIPTION

Introduction

The present disclosure provides processes for emulsifying viscous resins in the absence of solvent by heating the resin in a pressurized reaction vessel.

Viscosity may be measured as dynamic viscosity (unit of measurement is the pascal-second (Pa*S)) or as kinematic viscosity (unit of measurement is $m^2/s$ or stokes (St)). In embodiments, high viscosity resin refers to a resin with a melt viscosity of Pa*S from about 10 to 1,000,000 Pa*S at 130° C., from about 20 to 750,000 Pa*S at 130° C., from about 30 to 500,000 Pa*S at 130° C. In comparison, the viscosity of water at 20° C. is 0.001002 Pa*S or 1 cSt. In embodiments, the high viscosity resin has a melt viscosity from about 20 to about 100,000, from about 20 to about 50,000, from about 20 to about 10,000, from about 20 to about 1,000, from about 20 to about 500 or from about 20 to about 100 Pa*S at 130° C. In embodiments, the high viscosity resin has a melt viscosity from about 50 to about 100,000, from about 100 to about 100,000, from about 500 to about 100,000, from about 1000 to about 100,000 from about 10,000 to about 100,000 or from about 50,000 to about 100,000 Pa*S at 130° C.

In embodiments, the high viscosity resin comprises a softening point of at least about 110° C., at least about 115° C., at least about 120° C.

In embodiments, the high viscosity resin has a molecular weight of at least about 1,000, at least about 2,000, at least about 3,000, at least about 6,000, at least about 7,000, at least about 8,000.

The mixing mechanism of the reaction vessel may be operated continuously or intermittently, either alone or with another mixing mechanism, to form the emulsion. In the case of a rotating device to cause a circular stirring motion, the device can be operated at a speed of from about 100 rpm to about 10,000 rpm, from about 200 rpm to about 5,000 rpm, from about 300 rpm to about 2,000 rpm.

In embodiments, the high viscosity resin is heated to a temperature of about 90° C. or higher, about 100° C. or higher, about 105° C. or higher, about 110° C. or higher, about 115° C. or higher, about 120° C. or higher to form a heated resin. A processing temperature, under pressure, at or above 90° C. reduces resin viscosity without vaporizing water.

The heated resin, in the absence of an organic solvent, is combined with a surfactant, a neutralization agent and optionally water to form a mixture. The surfactant may be an anionic surfactant, a nonionic surfactants, a cationic surfactants or a combination thereof, as known or as taught herein.

The surfactant may be present in the mixture in an amount from about 1% to about 10% by weight of dry resin, from about 1.5% to about 8%, from about 2% to about 7% by weight of dry resin. In embodiments, the surfactant can be an anionic surfactant, such as, a DOWFAX.

In embodiments, the neutralizing agent is selected from the group consisting of inorganic basic agents and organic basic agents including ammonium hydroxide, potassium hydroxide, sodium hydroxide, sodium carbonate, sodium bicarbonate, lithium hydroxide, potassium carbonate, organoamines, such as, triethyl amine, monocyclic compounds and polycyclic compounds, each having at least one nitrogen atom, secondary amines, which include aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof. In one aspect, the neutralization agent is ammonium hydroxide ($NH_4OH$).

The neutralization agent may be present in the mixture in an amount from about 0.001% to about 100% by weight of dry resin, from about to about 50%, from about 0.1% to about 25% by weight of dry resin, from about 1% to about 20%, from about 1% to about 15%, from about 1% to about 10%.

Following addition of the surfactant and neutralization agent, pressure in the vessel containing the heated mixture is increased to from about 110 to about 1,000 kPa (kilopascal), from about 115 to about 750 kPa, from about 120 to about 500 kPa. The pressure can be from about 1 to about 1,500 kPa above ambient, from about 3 to about 1250 kPa, from about 5 to about 1000 kPa above ambient. In embodiments, the reaction vessel is pressurized, for example by steam, with a pressure from about 120 to about 160 kPa.

In embodiments, an initial amount of water optionally is added before the reaction vessel is pressurized. A portion of water is added to the heated mixture under pressure and mixed or agitated to form the emulsion. Pressure then is reduced, an optional third amount of water is added and the solvent-free emulsion comprising resin particles is obtained, see Example 1 and Table 1.

The obtained resin particles in the solvent-free emulsion may be from about 50 nm to about 900 nm, from about 60 nm to about 800 nm, from about 70 nm to about 700 nm in size.

In embodiments, the resin particles of a desired size may be obtained by adjusting the ratio of neutralization agent to dry resin based on acid value of the high viscosity resin, see, for example, Examples 1 and 2, wherein in one instance, a particle with a size of about 491 nm was obtained and in a second instance, a particle was obtained with a size of about 372 nm. Both particles were produced using the same high viscosity resin with an acid value of about 10.7 but with a range of neutralization agent amount from about 5% (for the larger particle size) by weight of dry resin to about 8% (for the smaller particle size) by weight of dry resin. Hence, the size of the resin particles can be tuned to a desired size by adjusting the ratio of neutralization agent to dry resin taking into account the acid value of the resin.

In embodiments, a process for preparing toner particles is provided, described in more detail below, wherein the solvent-free emulsion comprising high viscosity resin particles (of a particular size) is combined with an optional amorphous resin, an optional crystalline resin, an optional wax and an optional colorant; optionally an aggregating agent is added to form core particles in the emulsion; a shell resin optionally is added to form core-shell particles in the emulsion; freezing particle growth in the emulsion to form frozen particles; and coalescing the frozen particles to form toner particles.

Definitions

As used herein, the modifier, "about," used in connection with a quantity is inclusive of the stated value and has the meaning dictated by the context (for example, it includes at least the degree of error associated with the measurement of the particular quantity). In embodiments, the terms of interest comprise a variation of less than about 10% from the stated value. When used in the context of a range, the modifier, "about," should also be considered as disclosing the range defined by the absolute values of the two endpoints. For example, the range, "from about 2 to about 4," also discloses the range, "from 2 to 4."

As used herein, "the absence of an organic solvent" means that organic solvents are not used to dissolve the high viscosity resin for emulsification. Synonymous terms and phrases include, "solvent-free," "without any solvent," "no solvent,' zero solvent," and so on. However, it is understood that minor amounts of such solvents may be present in such resins as a consequence of the process of forming those resins.

As used herein, the term, "viscosity," refers to a complex viscosity, which is the measurement that can be provided by a mechanical rheometer that subjects a sample to a steady shear strain or a small amplitude sinusoidal deformation. The shear strain is applied by the operator to the motor and the sample deformation (torque) is measured by the transducer. Alternatively, a controlled-stress instrument, where the shear stress is applied and the resultant strain is measured, may be used. Such a rheometer provides a periodic measurement of viscosity at various plate rotation frequencies, $\omega$, rather than the transient measurement of, for instance, a capillary viscometer. The reciprocating plate rheometer measures both the in phase and out of phase fluid response to stress or displacement. The complex viscosity, $\eta^*$, can be defined as $\eta^*=\eta'-i\eta''$; where $\eta'=G''/\omega$, $\eta''=G'/\omega$ and i is $-1$. Alternatively, a viscometer that can measure only the transient measurement of, for instance, a capillary or shear viscosity can also be used.

Toner Particles

The toner particles of interest comprise at least one polyester resin emulsion prepared by the present solvent-free emulsification process. The toner particles may comprise additional resins, including polyester resin and/or polystyrene/acrylate resin, prepared by methods known in the art.

The present toner particles may be combined with (or without) any additive package and/or carriers known in the art and formulated into a developer for imaging purposes. In embodiments, the toner particle is an emulsion aggregation toner. The various components and materials of emulsion aggregation toners are provided below along with the process for preparing such toners.

i) Resins

In embodiments, a toner is disclosed including at least one resin emulsion prepared by the present solvent-free high viscosity resin emulsification process where the toner may be an EA toner, containing, but not limited to, an optional latex, an optional wax, an optional colorant and an optional polymer shell.

In embodiments, the polymer utilized to form the latex may be any polyester resin, including the resins described in U.S. Pat. Nos. 6,593,049 and 6,756,176, the disclosure of each of which herein is incorporated by reference in entirety. The polyester may be amorphous or crystalline, or both types of resins can be used.

Suitable amorphous resins include those disclosed in U.S. Pat. No. 6,063,827, the disclosure of which herein is incorporated by reference in entirety.

Suitable crystalline resins include those disclosed in U.S. Publ. No. 2006/0222991, the disclosure of which herein is incorporated by reference in entirety.

Suitable polyester latexes may also include a mixture of an amorphous polyester resin and a crystalline polyester resin as described, for example, in U.S. Pat. No. 6,830,860, the disclosure of which herein is incorporated by reference in entirety.

In embodiments, an unsaturated polyester resin may be utilized as a polyester latex resin. Examples of such resins include those disclosed in U.S. Pat. No. 6,063,827, the disclosure of which herein is incorporated by reference in entirety. Exemplary unsaturated polyester resins include, but are not limited to, poly(1,2-propylene fumarate), poly(1,2-propylene maleate), poly(1,2-propylene itaconate) and the like, and combinations thereof.

In what follows, an, "acid-derived component," indicates a constituent moiety of a polyester polymer that originally was an acid component or monomer before synthesis of the polyester resin and an, "alcohol-derived component," indicates a constituent moiety of the polyester polymer that originally was an alcoholic component or monomer reagent before synthesis of the polyester resin. As used herein, the alcohol and/or acid/ester monomer reagents are used to name the resulting polyester polymer, for example, when trimellitic acid is used as a reagent, the resulting polymer can be named herein as a trimellitic polyester. Similarly, a polyester made from 51 mole % trimellitic acid and 49 mole % propylene glycol can be said to comprise 51% trimellitic acid and 49% propylene glycol even though the polyester does not comprise 51% of actual trimellitic acid residues.

A, "crystalline polyester resin," indicates one that shows not a stepwise endothermic amount variation but a clear endothermic peak in differential scanning calorimetry (DSC). However, a polymer obtained by copolymerizing the crystalline polyester main chain and at least one other component is also called a crystalline polyester if the amount of the other component is 50% by weight or less. Acids having 6 to 10 carbon atoms may be desirable for obtaining suitable crystal melting point and charging properties. To improve the crystallinity, a straight chain carboxylic acid may be present in an amount of about 95% by mole or more of the acid component and, in embodiments, more than about 98% by mole of the acid component. Other acids are not restricted particularly, and examples thereof include conventionally known polyvalent carboxylic acids and polyhydric alcohols, for example, those described in, "Polymer Data Handbook: Basic Edition" (Soc. Polymer Science, Japan Ed.: Baihukan). As the alcohol component, aliphatic polyalcohols having from about 6 to about 10 carbon atoms may be used to obtain desirable crystal melting points and charging properties. To raise crystallinity, straight chain polyalcohols in an amount of about 95% by mole or more, about 98% by mole or more can be used.

In embodiments, the resin may be a polyester resin formed by reacting a polyol with a polyacid in the presence of an optional catalyst. Polycondensation catalysts which may be utilized in forming either the crystalline or amorphous polyesters include tetraalkyl titanates, dialkyltin oxides, such as, dibutyltin oxide, tetraalkyltins, such as, dibutyltin dilaurate, and dialkyltin oxide hydroxides, such as, butyltin oxide hydroxide, aluminum alkoxides, alkyl zinc, dialkyl zinc, zinc oxide, stannous oxide or combinations thereof. Such catalysts may be utilized in amounts of, for example, from about 0.01 mole percent to about 5 mole percent based on the starting polyacid or polyester used to generate the polyester resin.

For forming a crystalline polyester, suitable polyols include aliphatic polyols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol and the like; and mixtures thereof. The aliphatic polyol may be, for example, selected in an amount of from about 40 to about 60 mole percent, although an amount outside of that range can be used.

Examples of polyacids or polyesters, including vinyl polyacids or vinyl polyesters, selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid, mesaconic acid, a polyester or anhydride thereof; or mixtures thereof. The polyacid may be selected in an amount of from about 40 to about 60 mole percent.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethyene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), alkali copoly(5-sulfoisophthaloyl)-copoly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfo-isophthaloyl)-copoly(ethylene-adipate), alkali copoly(5-sulfo-isophthaloyl)-copoly (propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfoisophthaloyl)-copoly(ethylene-succinate), alkali copoly(5-sulfoisophthaloyl)-copoly(propylene-succinate), alkali copoly(5-sulfoisophthaloyl)-copoly(butylenes-succinate), alkali copoly(5-sulfoisophthaloyl)-copol (pentylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), poly(octylene-adipate), wherein alkali is as metal like sodium, lithium or potassium. Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide).

The crystalline resin may be present, for example, in an amount of from about 5 to about 50 percent by weight of the toner components. The crystalline resin can possess various melting points of, for example, from about 30° C. to about 120° C. The crystalline resin may have a number average molecular weight (Mn), as measured by gel permeation chromatography (GPC) of, for example, from about 1,000 to about 50,000 and a weight average molecular weight (Mw) of, for example, from about 2,000 to about 100,000. The molecular weight distribution (Mw/Mn) of the crystalline resin may be, for example, from about 2 to about 6.

Examples of polyacids or polyesters, including vinyl polyacids or vinyl polyesters, utilized for the preparation of amorphous polyesters include polycarboxylic acids or polyesters such as terephthalic acid, phthalic acid, isophthalic acid, fumaric acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecane diacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate and combinations thereof. The polyacid or polyester may be present, for example, in an amount from about 40 to about 60 mole percent of the resin.

Examples of polyols which may be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, 1,4-cyclohexanedimethanol, 1,3-cyclohexanedimethanol, xylenedimethanol, cyclohexanediol, diethylene glycol, dipropylene glycol, dibutylene, and combinations thereof. The amount of polyol selected can vary, for example, in an amount from about 40 to about 60 mole percent of the resin.

In embodiments, suitable amorphous resins include polyester, polyamides, polyimides, polyolefins, polyethylene, polybutylene, polyisobutyrate, ethylene-propylene copolymers, ethylene-vinyl acetate copolymers, polypropylene, combinations thereof, and the like.

The polyester resins may be synthesized from a combination of components selected from the above-mentioned monomer components, by using conventional known methods. Exemplary methods include the ester exchange method and the direct polycondensation method, which may be used singularly or in a combination thereof. The molar ratio (acid component/alcohol component) when the acid component and alcohol component are reacted, may vary depending on the reaction conditions. The molar ratio is usually about 1/1 in direct polycondensation. In the ester exchange method, a monomer such as ethylene glycol, neopentyl glycol or cyclohexanedimethanol, which may be distilled away under vacuum, may be used in excess.

The amorphous resin may be present, for example, in an amount of from about 30 to about 100 percent by weight of the toner components. In embodiments, the amorphous resin or combination of amorphous resins utilized in the latex may have a glass transition temperature (Tg) of from about 30° C. to about 80° C. In further embodiments, the combined resins utilized in the latex may have a melt viscosity of from about 10 to about 1,000,000 Pa*S at about 130° C.

One, two or more resins may be used. In embodiments, where two or more resins are used, the resins may be in any suitable ratio (e.g., weight ratio), such as, of from about 1% (first resin)/99% (second resin) to about 99% (first resin)/1% (second resin), in embodiments, from about 10% (first resin)/90% (second resin) to about 90% (first resin)/10% (second resin).

In embodiments, a suitable toner of the present disclosure may include two amorphous polyester resins and a crystalline polyester resin. The weight ratio of the three resins may be from about 30% first amorphous resin/65% second amorphous resin/5% crystalline resin, to about 60% first amorphous resin/20% second amorphous resin/20% crystalline resin.

In embodiments, a suitable toner of the present disclosure may include at least two amorphous polyester resins, a high molecular weight resin and a low molecular weight resin. As used herein, a high molecular weight (HMW) amorphous resin may have a weight average molecular weight (Mw) of from about 35,000 to about 150,000 and a low molecular weight (LMW) amorphous resin may have an Mw of from about 10,000 to about 30,000.

The weight ratio of the two resins may be from about 10% first amorphous resin 90% second amorphous resin, to about 90% first amorphous resin/10% second amorphous resin.

In embodiments, the resin may possess acid groups which, in embodiments, may be present at the terminus of the resin. Acid groups, which may be present, include carboxylic acid groups, and the like. The number of acid groups may be controlled by adjusting the materials utilized to form the resin and reaction conditions.

In embodiments, the resin has an acid number from about 2 mg KOH/g of resin to about 200 mg KOH/g of resin, from about 5 mg KOH/g of resin to about 50 mg KOH/g of resin, from about 10 mg KOH/g of resin to about 15 mg KOH/g of resin. The acid-containing resin may be dissolved in, for example, a tetrahydrofuran solution. The acid number may be detected by titration with KOH/methanol solution containing phenolphthalein as the indicator.

In embodiments, the toner may comprise a polystyrene/acrylate latex. Any monomer suitable for preparing a polystyrene/acrylate latex for use in a toner may be utilized. Such latexes may be produced by conventional methods. Suitable monomers useful in forming a latex emulsion, and thus the resulting latex particles in the latex emulsion, include, but are not limited to, styrenes, acrylates, methacrylates, butadienes, isoprenes, acrylic acids, methacrylic acids, acrylonitriles, combinations thereof and the like.

Exemplary polymers include styrene acrylates, styrene butadienes, styrene methacrylates, and more specifically, poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), poly(alkyl acrylate-acrylonitrile-acrylic acid), poly(styrene-butadiene), poly(methylstyrene-butadiene), poly(methyl methacrylate-butadiene), poly(ethyl methacrylate-butadiene), poly(propyl methacrylate-butadiene), poly (butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), poly(styrene-butyl acrylate-acrylonitrile-acrylic acid), poly(styrene-butadiene), poly(styrene-isoprene), poly(styrene-butyl methacrylate), poly(styrene-butyl acrylate-acrylic acid), poly(styrene-butyl methacrylate-acrylic acid), poly(butyl methacrylate-butyl acrylate), poly(butyl methacrylate-acrylic acid), poly(acrylonitrile-butyl acrylate-acrylic acid), and combinations thereof. The polymer may be block, random, or alternating copolymers.

ii) Surfactant

In embodiments, the process of the present disclosure optionally includes adding a surfactant before, during or after, melt-mixing the resin at an elevated temperature. In embodiments, the surfactant may be is added after melt-mixing the resin at an elevated temperature. Where utilized, a resin emulsion may include one, two or more surfactants. The surfactants may be selected from ionic surfactants and nonionic surfactants. Anionic surfactants and cationic surfactants are encompassed by the term, "ionic surfactants." In embodiments, the surfactant may be added as an aqueous solution with a concentration from about 5% to 100% (pure surfactant) by weight, from about 30% to 100% by weight. In embodiments, the surfactant may be utilized so that it is present in an amount of from about 0.01% to about 25% by weight of the resin, for example from about 0.1% to about 20% by weight of the resin, in embodiments from about 1% to about 15% by weight of the resin.

Any suitable surfactant may be used for the preparation of, for example, pigment, wax or any other dispersion according to the present disclosure. Depending on the emulsion system, any desired nonionic or ionic surfactant, such as, anionic or cationic surfactant, may be contemplated.

Examples of suitable anionic surfactants include, but are not limited to, sodium dodecylsulfate (SDS), sodium dodecylbenzene sulfonate, sodium dodecylnaphthalenesulfate, dialkyl benzenealkyl sulfates and sulfonates, abitic acid, NEOGEN R® and NEOGEN SC® available from Kao, Tayca Power®, available from Tayca Corp., DOWFAX®, available from Dow Chemical Co., and the like, as well as mixtures thereof.

Examples of suitable cationic surfactants include, but are not limited to, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$,$C_{17}$-trimethyl ammonium bromides, halide salts of quaternized polyoxyethylalkylamines, dodecylbenzyl triethyl ammonium chloride, MIRAPOL® and ALKAQUAT® (available from Alkaril Chemical Company), SANIZOL® (benzalkonium chloride, available from Kao Chemicals), and the like, as well as mixtures thereof.

Examples of suitable nonionic surfactants include, but are not limited to, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy)ethanol (available from sanofi as ANTAROX 890®, IGEPAL CA-210®, IGEPAL CA-520®, IGEPAL CA-720®, IGEPAL CO-890®, IGEPAL CO-720®, IGEPAL CO-290®, IGEPAL CA-210® and ANTAROX 897®) and the like, as well as mixtures thereof.

Surfactants may be employed in any desired or effective amount, for example, at least about 0.01% by dry or wet weight of reagents used to prepare the dispersion, at least about 0.1% by dry or wet weight of reagents used to prepare the dispersion; no more than about 10% by dry or wet weight of the reagents used to prepare the dispersion, although the amount can be outside of those ranges.

iii) Neutralization Agent

In embodiments, the resin, including a high viscosity polyester resin, may be mixed with a base or neutralization agent. In embodiments, the neutralization agent may be used to neutralize acid groups in the resins, so a neutralization agent herein may also be referred to as a, "basic neutralization agent."

Any suitable basic neutralization reagent may be used in accordance with the present disclosure. In embodiments, suitable basic neutralization agents may include both inorganic basic agents and organic basic agents. Suitable basic agents may include ammonium hydroxide, potassium hydroxide, sodium hydroxide, sodium carbonate, sodium bicarbonate, lithium hydroxide, potassium carbonate, combinations thereof and the like. Suitable basic agents may also include monocyclic compounds and polycyclic compounds having at least one nitrogen atom, such as, for example, secondary amines, which include aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines and combinations thereof. In embodiments, the monocyclic and polycyclic compounds may be unsubstituted or substituted at any carbon position on the ring. The pH may be increased using a basic buffer.

The basic agent may be utilized in an amount of from about 0.001% by weight to 100% by weight of the resin, from about 0.01% by weight to about 50% by weight of the resin, from about 1% by weight to 25% by weight of the resin. The amount of neutralization agent is governed in part by the acid value of the resin(s). Hence, the higher the acid value, the more neutralization agent may be used. Also, as taught herein, particle size is dependent on the amount of neutralization agent used.

In embodiments, the neutralization agent may be added in the form of an aqueous solution. In embodiments, the neutralization agent may be added in the form of a solid. In embodiments, plural forms of bases are used in a process of interest. Hence, a process can comprise a first base, and at a different or successive step, a second base is used. The first and second bases can be the same or different.

Utilizing the above basic neutralization agent in combination with a resin possessing acid groups, a neutralization ratio of from about 20% to about 500% may be achieved, from about 30% to about 400%. In embodiments, the neutralization ratio may be calculated using the following equation:

Neutralization ratio in an equivalent amount of 10% $NH_3$/resin(g)/resin acid value/0.303*100.

The addition of the basic neutralization agent may raise the pH of an emulsion including a resin possessing acid groups from about 5 to about 13, from about 6 to about 11. The neutralization of the acid groups may, in embodiments, enhance formation of the emulsion.

iv) Initiator

Any suitable initiator or mixture of initiators may be used in the latex process and the toner process.

Although water soluble free radical initiators are used in emulsion polymerization reactions, other free radical initiators also can be used. Examples of suitable free radical initiators include peroxides, azo compounds and the like; and mixtures thereof.

Based on total weight of the monomers to be polymerized, the initiator may be present in an amount from about 0.1% to about 5% by weight or volume, although may be present in a greater or a lesser amount.

v) Chain Transfer Agent

A chain transfer agent optionally may be used to control the polymerization degree of the latex and thereby control the molecular weight and molecular weight distribution of the product latex. As can be appreciated, a chain transfer agent can become part of the latex polymer.

A chain transfer agent can have a carbon-sulfur covalent bond with an absorption peak in a wavelength region from about 500 to about 800 $cm^{-1}$ in an infrared absorption spectrum. When the chain transfer agent is incorporated into the latex and the toner made from the latex, the absorption peak may be changed, for example, to a wavelength from about 400 to about 4,000 $cm^{-1}$.

Exemplary chain transfer agents include, but are not limited to, n-$C_{3-15}$ alkylmercaptans; branched alkylmercaptans; aromatic ring-containing mercaptans; and so on. The terms, "mercaptan," and, "thiol," may be used interchangeably to mean C—SH group.

Examples of such chain transfer agents also include, but are not limited to, dodecanethiol, butanethiol, isooctyl-3-mercaptopropionate, 2-methyl-5-t-butyl-thiophenol, carbon tetrachloride, carbon tetrabromide and the like.

Based on total weight of the monomers to be polymerized, the chain transfer agent may be present in an amount from about 0.1% to about 7%, although may be present in greater or lesser amounts.

vi) Branching Agent

A branching agent optionally may be included to control the branching degree and structure of the target latex. Exemplary branching agents include, but are not limited to, decanediol diacrylate (ADOD), trimethylolpropane, pentaerythritol, trimellitic acid, pyromellitic acid, a carboxylic acid comprising three or more acid groups and mixtures thereof.

Based on total weight of the monomers to be polymerized, the branching agent may be present in an amount from about 0% to about 5%, although may be present in a greater or a lesser amount.

vii) Emulsion

The present toners are prepared using at least one high viscosity resin particles made by the instant solvent-free emulsion process. However, the toners may also be prepared using additional latexes and/or emulsions made by other known process.

In embodiments, a method of solvent-free emulsification is disclosed including combining a heated high viscosity resin with a surfactant and a neutralization agent to form a mixture in a reaction vessel comprising a mixing device without use of a solvent; increasing pressure in the reaction vessel to from about 110 to about 1000 kPa; adding water to the mixture to form an emulsion under agitation and then reducing the pressure in the reaction vessel to obtain a solvent-free emulsion comprising resin particles.

Any type of reactor may be used without restriction. The reactor includes means for stirring the compositions therein, such as, an impeller. A reactor can include at least one impeller. For forming the latex and/or toner, the reactor can be operated throughout the process such that the impellers can operate at an effective mixing rate of about 10 to about 1,000 rpm. The reactor can be a continuous reactor of lower reaction volume occurring under flow of reactants in and product out through a directional flow path, such as, a conduit or a tube. Batch and continuous devices and methods can be combined in a process for making toner.

In embodiments, the reactor is pressurized using an inert gas, such as, nitrogen, wherein the nitrogen is injected into the reactor with a suitable conduit or device, such as, a nozzle. Other means of pressurizing the reactor can be used, such as, introduction of steam, so long as the boiling point of water is increased.

In embodiments, following completion of the resin and other components, such as, surfactant and neutralization agent, the latex may be permitted to stabilize by maintaining the conditions for a period of time, for example for about 10 to about 300 min, before cooling and/or reducing pressure in the reactor. The latex formed by the above process may be isolated by standard methods known in the art, for example, decanting, centrifugation, filtration, desiccation and the like.

The latex of the present disclosure may be melt blended or otherwise mixed with various toner ingredients, such as, an optional wax dispersion, an optional colorant, an optional coagulant, an optional surfactant and the like to make toner.

Based on the total toner weight, the latex may be present in an amount from about 30% to about 98% by weight of the reagents, although may be present in a greater or a lesser amount. Methods of producing latex may be carried out as described in U.S. Pat. No. 7,524,602, the entire disclosure of which herein is incorporated by reference in entirety.

viii) Colorants

Various known suitable colorants, such as dyes, pigments, mixtures of dyes, mixtures of pigments, mixtures of dyes and pigments and the like may be included in the toner. The colorant may be included in the toner in an amount of, for example, 0 to about 35% by weight of the toner, although amounts outside of that range may be utilized.

As examples of suitable colorants, mention may be made of carbon black, magnetites and the like. As colored pigments, there can be selected cyan, magenta, yellow, red, green, brown, blue or mixtures thereof. Generally, cyan, magenta or yellow pigments or dyes, or mixtures thereof, are used. The pigment or pigments can be water-based pigment dispersions.

ix) Wax

In addition to the polymer resin, the toners of the present disclosure also may contain a wax, which can be either a single type of wax or a mixture of two or more different waxes. When included, the wax may be present in an amount of, for example, from about 1 wt % to about 25 wt % of the toner particles. The melting point of a wax can be at least about 30° C. Waxes that may be selected include waxes having, for example, a weight average molecular weight of from about 500 to about 20,000.

Waxes that may be used include, for example, polyolefins, plant-based waxes, animal-based waxes, mineral-based waxes, petroleum-based waxes, ester waxes, functionalized waxes and so on. Mixtures and combinations of the foregoing waxes may be used.

Toner Preparation

The toner particles may be prepared by any method within the purview of one skilled in the art. Although embodiments are described below with respect to emulsion aggregation (EA) processes, any suitable method of preparing toner particles may be used, including chemical processes, such as, suspension and encapsulation processes disclosed in U.S. Pat. Nos. 5,290,654 and 5,302,486, the entire disclosure of each of which herein is incorporated by reference in entirety.

In an EA process, a mixture of an optional wax and any other desired or required additives, and emulsions including the resins, for example, a polyester, a vinyl polymer, a styrene polymer and so on, including a resin of interest described above, optionally with surfactants, as described above, are aggregated and then optionally coalesced, see, for example, U.S. Pat. No. 6,120,967, the entire disclosure of which herein is incorporated by reference in entirety. The pH of the resulting mixture may be adjusted by an acid, such as, for example, acetic acid, nitric acid or the like. In embodiments, the pH of the mixture may be adjusted to from about 2 to about 4.5. Additionally, in embodiments, the mixture may be homogenized by mixing at about 600 to about 4,000 revolutions per minute (rpm). Homogenization may be accomplished by any suitable means, including, for example, with an IKA ULTRA TURRAX T50 probe homogenizer.

Following preparation of the above mixture, an aggregating agent (or coagulant) may be added to the mixture. Suitable aggregating agents include, for example, aqueous solutions of a divalent cation or a multivalent cation material. The aggregating agent may be, for example, a polyaluminum halide, such as, polyaluminum chloride (PAC), or the corresponding bromide, fluoride or iodide, a polyaluminum silicate, such as, polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof.

In embodiments, the aggregating agent may be added to the mixture at a temperature that is below the glass transition temperature ($T_g$) of the resin. The aggregating agent may be added to the mixture in an amount of, for example, from about 0.1 part per hundred (pph) to about 1 pph.

To control aggregation and coalescence of the particles, the aggregating agent may be metered into the mixture over time. For example, the agent may be metered into the mixture over a period of from about 5 to about 240 min. Addition of the agent also may be done while the mixture is maintained under stirred conditions, in embodiments, from about 50 rpm to about 1,000 rpm, and at a temperature that is below the $T_g$ of the resin.

The aggregation thus may proceed by maintaining the elevated temperature, or slowly raising the temperature to, for example, from about 40° C. to about 100° C., and holding the mixture at that temperature for a time from about 0.5 hr to about 6 hr, while maintaining stirring, to provide the aggregated particles.

The particles may be permitted to aggregate until a predetermined desired particle size is obtained. Particle size can be monitored as known in the art, for example, with a COULTER COUNTER, for average particle size.

Once the desired final size of the toner particles is achieved, the pH of the mixture may be adjusted with a base or a buffer to a value of from about 6 to about 10. The adjustment of the pH may be utilized to freeze, that is, to stop, toner growth. The base utilized to stop toner growth may include any suitable base, such as, for example, alkali metal hydroxides, such as, for example, sodium hydroxide, potassium hydroxide, ammonium hydroxide, combinations thereof and the like. In embodiments, a chelator, such as, ethylene diamine tetraacetic acid (EDTA) may be added to help adjust the pH to the desired values noted above.

i) Shell Resin

In embodiments, a shell may be applied to the formed aggregated toner particles. Any resin described above as suitable for the core resin may be utilized as the shell resin. The shell resin may be applied to the aggregated particles by any method within the purview of those skilled in the art. In embodiments, an amorphous polyester may be utilized to form a shell over the aggregates to form toner particles having a core-shell configuration.

The optional shell component may comprise about 5 to about 50% by weight of the toner particles, although an amount can be outside of that range. A thicker shell may provide improved charging characteristics due to the higher surface area of the toner particle. Thus, the shell resin may be present in an amount from about 30% to about 70% by weight of the toner particles. In embodiments, the shell has a higher $T_g$ than the aggregated toner particles. The shell can carry one or more toner components, such as, a charge control agent, a colorant, such as, a carbon black, a silica and so on.

In embodiments, a photoinitiator may be included in the resin mixture for forming the shell. The shell resin can contain a branching agent.

ii) Coalescence

Following aggregation to the desired particle size, with the optional formation of a shell as described above, the particles then may be coalesced to the desired final shape, the coalescence being achieved by, for example, heating the mixture to a temperature of from about 55° C. to about 100° C., which may be below the melting point of any crystalline resin present to prevent plasticization. Higher or lower temperatures may be used, it being understood that the temperature is a function of the resins used. Coalescence may proceed over a period of from about 0.1 to about 9 hr.

After coalescence, the mixture may be cooled to room temperature (RT), such as from about 20° C. to about 25° C. The cooling may be rapid or slow, as desired. A suitable cooling method may include introducing cold water to a jacket around the reactor. After cooling, the toner particles optionally may be washed with water and then dried. Drying may be accomplished by any suitable method, for example, freeze drying.

iii) Additives

Toner particles also may contain other optional additives, as desired or required. For example, the toner may include any known charge additives in amounts of from about 0.1 to about 10 wt % of the toner. Examples of such charge additives include alkyl pyridinium halides, bisulfates, the charge control additives of U.S. Pat. Nos. 3,944,493, 4,007,293, 4,079,014, 4,394,430 and 4,560,635, the entire disclosure of each of which herein is incorporated by reference in entirety, negative charge enhancing additives, such as, aluminum complexes, and the like.

Surface additives can be added to the toner compositions after washing or drying. Examples of such surface additives include, for example, metal salts, metal salts of fatty acids, colloidal silicas, metal oxides, strontium titanates, mixtures thereof and the like. Surface additives may be present in an amount of from about 0.1 to about 10 wt % of the toner. Examples of such additives include those disclosed in U.S. Pat. Nos. 3,590,000, 3,720,617, 3,655,374 and 3,983,045, the entire disclosure of each of which herein is incorporated by reference in entirety. Other additives include zinc stearate and AEROSIL R972® (Degussa). The coated silicas of U.S. Pat. Nos. 6,190,815 and 6,004,714, the entire disclosure of each of which herein is incorporated by reference in entirety, also can be present in an amount of from about 0.05 to about 5% of the toner, which additives can be added during aggregation or blended into the formed toner product.

The characteristics of the toner particles may be determined by any suitable technique and apparatus. Volume average particle diameter $D_{50v}$, geometric standard deviation (GSD) volume ($GSD_v$) and number GSD ($GSD_n$) may be measured by means of an instrument, such as, a Beckman Coulter MULTISIZER 3, operated as recommended by the manufacturer.

Utilizing the methods of the present disclosure, desirable gloss levels may be obtained. Thus, for example, a toner may have a gloss, as measured with a Gardner device, of from about 20 gloss units (gu) to about 100 gu. The gloss of a toner may be influenced by the amount of retained metal ion, such as, $Al^{3+}$, in the particle. In embodiments, the amount of retained metal ion, for example, $Al^{3+}$, in toner particles of the present disclosure may be from about 0.1 parts per hundred (pph) to about 1 pph.

In embodiments, toners of the present disclosure may be utilized as ultralow melt (ULM) toners.

In embodiments, the dry toner particles, exclusive of external surface additives, may have the following characteristics: (1) circularity of from about 0.9 to about 1 (measured with, for example, a Sysmex 3000); (2) Tg of from about 45° C. to about 60° C.; and/or (3) melt flow index (MFI) in g/10 min (5 kg/130° C.) of from about 70 to about 175.

Toners may possess favorable charging characteristics when exposed to extreme RH conditions. The low humidity zone (C zone) may be about 12° C./15% RH, while the high humidity zone (A zone) may be about 28° C/85% RH. Toners of the disclosure may possess a parent toner charge per mass ratio (q/m) of from about −5 μC/g to about −80 μC/g and a final toner charging after surface additive blending of from −15 μC/g to about −60 μC/g.

Thus, in embodiments, toner A zone charge may be from about −15 to about −60 μC/g while C zone charge may be from about −15 to about −60 μC/g. The ratio of A zone charge to C zone charge, sometimes referred to herein as the RH ratio or RH sensitivity, may be from about 0.4 to about 1.0.

Developers

The toner particles thus formed may be formulated into a developer composition. For example, the toner particles may be mixed with carrier particles to achieve a two component developer composition. The toner concentration in the developer may be from about 1% to about 25% by weight of the total weight of the developer with the remainder of the developer composition being the carrier. However, different toner and carrier percentages may be used to achieve a developer composition with desired characteristics.

i) Carriers

Examples of carrier particles for mixing with the toner particles include those particles that are capable of triboelectrically obtaining a charge of polarity opposite to that of the toner particles. Illustrative examples of suitable carrier particles include granular zircon, granular silicon, glass, steel, nickel, ferrites, iron ferrites, silicon dioxide, one or more polymers and the like. Other carriers include those disclosed in U.S. Pat. Nos. 3,847,604; 4,937,166; and 4,935,326, the entire disclosure of each of which is incorporated herein by reference in entirety.

In embodiments, the carrier particles may include a core with a coating thereover, which may be formed from a polymer or a mixture of polymers that are not in close proximity thereto in the triboelectric series, such as, those as taught herein or as known in the art. The coating may include fluoropolymers, terpolymers of styrene, silanes and the like. The coating may have a coating weight of, for example, from about 0.1 to about 10% by weight of the carrier.

Devices Comprising a Toner Particle

Toners may be combined with a number of devices ranging from enclosures or vessels, such as, a vial, a bottle, a flexible container, such as a bag or a package, and so on, to devices that serve more than a storage function.

i) Imaging Device Components

The toner of interest may be incorporated into devices dedicated, for example, to delivering same for a purpose, such as, forming an image. Hence, particularized toner delivery devices are known, see, for example, U.S. Pat. No. 7,822,370, and may contain a toner of interest. Such devices include cartridges, tanks, reservoirs and the like, and may be replaceable, disposable or reusable. Such a device may comprise a storage portion; a dispensing or delivery portion; and so on; along with various ports or openings to enable toner addition to and removal from the device; an optional portion for monitoring amount of toner in the device; formed or shaped portions to enable siting and seating of the device in, for example, an imaging device; and so on.

ii) Toner Delivery Device

A toner of interest may be included in a device dedicated to delivery thereof, for example, for recharging or refilling toner in an imaging device component, such as, a cartridge, in need of toner, see, for example, U.S. Pat. No. 7,817,944, wherein the imaging device component may be replaceable or reusable.

Imaging Devices

The toners may be used for electrostatographic or electrophotographic processes, including those disclosed in U.S. Pat. No. 4,295,990, the entire disclosure of which herein is incorporated by reference in entirety. In embodiments, any known type of image development system may be used in an image developing device, including, for example, magnetic brush development, jumping single component development, hybrid scavengeless development (HSD) and the like. Those and similar development systems are within the purview of those skilled in the art.

Color printers commonly use four housings carrying different colors to generate full color images based on black plus the standard printing colors, cyan, magenta and yellow. However, in embodiments, additional housings may be desirable, including image generating devices possessing five housings, six housings or more, thereby providing the ability to carry additional toner colors to print an extended range of colors (extended gamut).

The following Examples are submitted to illustrate embodiments of the disclosure. The Examples are intended to be illustrative only and are not intended to limit the scope of the disclosure. Also, parts and percentages are by weight unless otherwise indicated.

EXAMPLES

Example 1

A 1 liter BUCHI reactor was charged with 250 grams of a resin (softening point of 119.6° C.; acid value of 10.7). The resin was heated to about 110-120° C. with stirring increased from about 20 rpm to about 800 rpm, followed by addition of 18.3 grams of anionic surfactant (DOWFAX, 47 wt %). Thereafter, 150 g of DIW containing 12.8 grams of 10 wt % NH$_4$OH were pumped into the reactor at a rate of 2 g/min. The BUCHI reactor was pressurized by nitrogen with a pressure of 110 to 150 kPa. The process parameters are summarized in Table 1.

Next, 360 g of additional water were added to the above emulsion within 30 min.

The resulting emulsion had a particle size of 491 nm.

Table 2 shows a comparison of dried resin Tg and Mw before and after emulsification.

TABLE 1

Temperature and Pressure Profile of Reaction of Example 1

| Time | Set point (° C.) | Actual temp (° C.) | RPM | Pressure (KPa) | Comment |
|---|---|---|---|---|---|
| 10:00 AM | 110 | 25 | 0 | | Heating started |
| 1:43 PM | 110 | 95.6 | 16 | 100 | Stirring started |
| 2:00 PM | 120 | 98 | 150 | 100 | DIW and NH$_4$OH addition started |
| 2:07 PM | 120 | 109.8 | 260 | 120 | |
| 2:40 PM | 110 | 109.6 | 660 | 140 | |
| 3:03 PM | 110 | 104 | 800 | 150 | |
| 4:40 PM | 110 | 100.1 | 800 | 100 | Second portion of DIW addition started |
| 5:11 PM | 110 | 93.9 | 800 | 100 | Emulsification completed. |

TABLE 2

Molecular weight and Tg comparison before and after emulsification

| | Resin | Emulsion |
|---|---|---|
| Mw | 70617 | 63319 |
| Mn | 3631 | 3865 |
| Tg on | 55.04 | 54.87 |
| Tg mid | 58.50 | 58.70 |
| Tg off | 61.69 | 62.53 |

Example 2

That materials and method of Example 1 were repeated except that the amount of anionic surfactant (DOWFAX, 47 wt %) was reduced from 18.3 g to 16.05 g (3 wt % based on dry resin) and the amount of NH$_4$OH was increased from 12.8 to 19.2 g.

The emulsion obtained had a particle size of 372 nm.

The process and formulation to obtain a solvent-free emulsion comprising resin particles can be optimized for any resin to reach a target particle size by changing the amount of neutralization agent, such as NH$_4$OH, depending on the acid value of the resin.

It will be appreciated that several of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material.

The entire disclosure of all references cited herein each is incorporated herein by reference in entirety.

We claim:

1. A process of solvent-free emulsion comprising:
    a) heating at least one high viscosity resin to a temperature of about 90° C. or higher to form a heated resin in a reaction vessel comprising a mixing device; wherein the high viscosity resin comprises a resin having a melt viscosity of from about 10 to about 1,000,000 Pa*S at about 130° C.;
    b) combining the heated resin with a surfactant and a neutralization agent in the absence of an organic solvent to form a mixture in said reaction vessel;
    c) increasing pressure in said vessel to from about 10 to about 1000 kPa;
    d) adding water to said mixture to form an emulsion under agitation; and
    e) reducing pressure in said vessel to obtain a solvent-free emulsion comprising resin particles.

2. The process of claim 1, wherein the surfactant is present in an amount from about 1% to about 10% by weight of dry resin.

3. The process of claim 1, wherein the neutralization agent is present in an amount from about 1% to about 15% by weight of dry resin.

4. The process of claim 1, wherein amount of neutralization agent is adjusted based on acid value of the resin to obtain resin particles of a desired size.

5. The process of claim 1, wherein the resin particles comprises an average size of about 50 nm to about 900 nm.

6. The process of claim 1, wherein the high viscosity resin comprises a molecular weight of at least about 5,000.

7. The process of claim 1, wherein the high viscosity resin comprises a melt viscosity of from about 30 to about 500,000 Pa*S at about 130° C.

8. The process according to claim 1, wherein the neutralization agent comprises an inorganic basic agent or an organic basic agent.

9. The process of claim 1, wherein the neutralization agent comprises an organoamine, a monocyclic compound comprising at least one nitrogen atom, a polycyclic compound comprising at least one nitrogen atom or a secondary amine.

10. The process of claim 1, wherein the neutralization agent comprises ammonium hydroxide, potassium hydroxide, sodium hydroxide, sodium carbonate, sodium bicarbonate, lithium hydroxide, potassium carbonate or triethyl amine.

11. The process of claim 1, wherein said neutralization agent comprises an aziridine, an azetidine, a piperazine, a piperidine, a pyridine, a bipyridine, a terpyridine, a dihydropyridine, a morpholine, an N-alkylmorpholine, a 1,4-diazabicyclo[2.2.2]octane, a 1,8-diazabicycloundecane, a 1,8-diazabicycloundecene, a dimethylated pentylamine, a trimethylated pentylamine, a pyrrole, a pyrrolidine, a pyrrolidinone, an indole, an indoline, an indanone, a benzindazone, an imidazole, a benzimidazole, an imidazolone, an imidazoline, an oxazole, an isoxazole, an oxazoline, an oxadiazole, a thiadiazole, a carbazole, a quinoline, an isoquinoline, a naphthyridine, a triazine, a triazole, a tetrazole, a pyrazole, a pyrazoline or a combination thereof.

12. The process of claim 1, wherein the surfactant is selected from the group consisting of anionic surfactants, nonionic surfactants, cationic surfactants and combinations thereof.

13. The process of claim 1, wherein the high viscosity resin comprises a softening point of at least about 120° C.

14. The process of claim 1, wherein the high viscosity resin comprises a polyester resin.

15. A process of solvent-free emulsion comprising:
   a) heating at least one high viscosity polyester resin comprising a softening point of at least about 115° C. to a temperature of about 110° C. to about 120° C. to form a heated resin in a reaction vessel comprising a mixing device;
   wherein the high viscosity resin comprises a resin having a melt viscosity of from about 10 to about 1,000,000 Pa*S at about 130° C.;
   b) combining the heated resin with a surfactant and a neutralization agent in the absence of an organic solvent to form a mixture in said reaction vessel;
   c) increasing pressure in said vessel above 1 atmosphere;
   d) adding water to said mixture to form an emulsion; and
   e) reducing pressure in said vessel to obtain a solvent-free emulsion comprising resin particles.

16. The process of claim 15, wherein the neutralization agent is present in an amount from about 1% to about 15% by weight of dry resin.

17. The process of claim 15, wherein amount of neutralization agent is adjusted based on acid value of the resin to obtain resin particles of a desired size.

18. The process of claim 15, wherein the resin particles comprise an average size of about 50 nm to about 900 nm.

19. The process of claim 15, wherein the high viscosity resin comprises a molecular weight of at least about 5,000.

20. The process of claim 15, wherein the high viscosity resin comprises a melt viscosity of from about 30 to about 500,000 Pa*S at about 130° C.

* * * * *